United States Patent Office 3,836,638
Patented Sept. 17, 1974

3,836,638
CERTAIN HYDROXYLATED POLYMERS USEFUL IN FORMING PESTICIDAL PHOSPHATE GELS
Ronald S. Smith, Gilroy, Jerome G. Kuderna, Jr., Modesto, and Richard C. Potter, Lafayette, Calif., assignors to Shell Oil Company
No Drawing. Continuation-in-part of abandoned application Ser. No. 166,978, July 28, 1971. This application May 3, 1973, Ser. No. 356,858
Int. Cl. A01n 9/36
U.S. Cl. 424—78          10 Claims

ABSTRACT OF THE DISCLOSURE

A gel-like composition useful for controlling invertebrate pests comprising an activated vinyl phosphorus ester admixed with a hydroxylated polymer, compatible with said ester, a certain proportion of said ester being interacted with said hydroxylated polymer to form a cross-linked polymer network.

CROSS-REFERENCE TO RELATED APPLICATIONS

This is a continuation-in-part of application Ser. No. 166,978, filed July 28, 1971, now abandoned.

BACKGROUND OF THE INVENTION

This invention relates to novel combinations of activated phosphorus esters and hydroxylated polymers compatible with said esters. More particularly this invention relates to novel gel-like compositions containing in each case an activated organic phosphorus ester and a hydroxylated polymer compatible with said ester and wherein a minor amount of the activated phosphorus ester has been interacted with the hydroxylated polymer to form a cross-linked polymer network. These compositions are gel-like in consistency. The amount of phosphorus involved in the cross-linking is relatively small, but greatly adds to the gel strength while leaving the bulk of the phosphorus ester unaffected.

Activated phosphorus esters and, in particular, vinyl phosphate esters are known to be biologically active. These compounds are known to be effective in the control of invertebrate pests and function by contact, by ingestion, or by inhalation of the active ester. Moreover, when some of these compounds are formulated in a plasticized resin such as plasticized polyvinyl chloride, they are useful in controlling endoparasites in animals and birds as disclosed in U.S. Pat. 3,166,472. These activated phosphorus ester-resin formulations slowly release the active ester into the atmosphere and are also effective in the control of invertebrate pests as taught in U.S. Pat. 3,318,769. Resin formulations which slowly release a biocide, such as an activated phosphate, into the atmosphere are hereinafter referred to by such terms as slow release formulations, slow release generators or simply, generators.

While prior art slow release formulations have proven to be effective because of ease in handling, use and overall consumer acceptance, there are still certain disadvantages associated with the use of an activated phosphorus ester in a plasticized resin such as polyvinyl chloride. For example, the amount of active ingredient such as dimethyl (2,2-dichlorovinyl)phosphate(DDVP) that can be combined as a practical matter with such plasticized polyvinyl chloride resin is rather low. This means that the slow release generator based on this formulation has to be rather large in size in order to contain the required amount of activated phosphorus ester. Associated with the size of the generator and the content of the active ingredient in the plasticized resin is the surface area required for the diffusion of the activated phosphorus ester into the surrounding atmosphere. In order to maintain sufficient biocide release over a sustained period of time a rather high surface area is required in proportion to the size of the generator. This, however, results in a higher initial release of biocide than is necessary. Another disadvantage of the prior art generators is the inability of the plasticized resin to maintain the active ingredient at sufficiently high concentrations. At concentrations required for efficiency a certain amount of the active phosphorus ester combines with atmospheric moisture to produce an unsightly wetness or bleeding at the surface of the generator. There are also processing disadvantages in the plasticized polyvinyl chloride resin-activated phosphorus ester combinations. For example, in extruding the prior art generators, a rather high temperature is required which results in the loss of some of the activated phosphorus ester. Moreover, there is a limitation as to the size and shape of the generators of prior art compositions that can be prepared.

DESCRIPTION OF THE PRIOR ART

The closest prior art appears to be U.S. Pat. 3,318,769, which discloses compositions containing a solid organic macromolecular thermoplastic resin and dialkyl beta-halogen-substituted vinyl phosphate.

DESCRIPTION OF THE INVENTION

Compositions having gel-like consistency have now been discovered which comprise, in admixture, a phosphorus ester-compatible hydroxylated polymer and an activated phosphorus-containing ester, said composition having a minor amount of said ester interacted with said hydroxylated polymer to form a cross-linked polymer network. Whether the phosphorus in this cross-linked network is bound covalently to the hydroxylated polymer or in a strong complex is not known, however, the amount of phosphate involved in this cross-linking is of the order of about 0.5 to 5% w. under normal conditions but can increase as curing time and curing temperatures are increased. The cross-linking greatly adds to the gel strength, while leaving the bulk of the phosphate ester unaffected. These gel compositions contain higher amounts of activated phosphorus compounds per unit area than do the prior art generators, have a rigid network, can be made into useful generators having a low surface area per unit of active ingredient, have good storage stability and are resistant to bleeding. Furthermore, these compositions are easily processed at relatively low temperatures and can be cast or molded into any desired shape.

It has now been found that the formulations of this invention are free of the disadvantages of the prior art formulations. The new formulations possess an enhanced diffusion coefficient, and are capable of containing relatively large amounts of activated phosphorus ester, are functional with a lower surface area, are resistant to bleeding, can be fabricated to initially release less biocide and are more easily processed into various sizes and shapes than prior art formulations.

The hydroxylated polymers which are useful in the compositions of the present invention are those which are compatible with the activated phosphorus ester. By use of the terms "compatible" or "compatibility" is meant the ability of two or more substances to mix with each other to form a homogeneous composition of useful plastic properties, or that such substances may be intimately blended. (See Kirk Othmer, Encyclopedia of Chemical Technology, Second Edition, Volume 15, Page 730.) Rather than the invention being limited to a particular class or classes of hydroxylated polymers, it appears that there are three criteria that a particular polymer must meet:

(1) The polymer must be compatible with the activated phosphorus ester being used,
(2) The polymer must contain hydroxyl groups, and
(3) The polymer must have a molecular weight in the range of about 30,000 to 1,000,000, or perhaps even higher.

This invention is not limited to any particular class or classes of polymers as any polymers are believed to be useful as long as the above criteria are met. The following classes of hydroxylated polymers have been shown to be useful in the present invention: polyvinyl acetals such as polyvinyl formal, polyvinyl acetal, polyvinyl butyral, and polyvinyl valeral having hydroxyl groups; polyvinyl esters such as polyvinyl acetate and polyvinyl butyrate containing hydroxyl groups; mixtures of polyvinyl acetal and polyvinyl esters having hydroxyl groups; terpolymers of vinyl chloride with vinyl esters having hydroxyl groups; copolymers of partially hydrolyzed vinyl chloride and polyvinyl acetate; hydroxylated cellulose ethers such as hydroxypropyl cellulose, ethylene-vinyl acetate copolymers having hydroxyl groups; hydroxylated polybutadiene; hydroxylated block copolymers such as SBS rubbers; hydroxylated polyethylene and polypropylene and copolymers thereof; and hydroxylated copolymers of vinyl acetaste and acrylate esters such as polymethyl methacryalte and polyethyl methacrylate.

Preferred among the hydroxylated polymers because of their ready availability are the hydroxylated polyvinyl acetals and polyvinyl esters such as polyvinyl butyral, and hydroxylated polyvinyl acetates and mixtures thereof. These compounds may be defined by the formula:

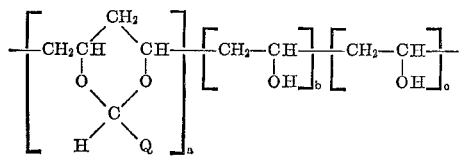

wherein Q is H, alkyl, haloalkyl or hydroxyalkyl of 1-8 carbon atoms, alkenyl of 2-8 carbon atoms, halogen or hydroxyl; Y' is alkyl of 1-9 carbon atoms, a, b, and c are integers indicating the relative percent by weight of acetal, hydroxyl and ester groupings in the polymer. These groupings are randomly distributed along the molecule. In order to obtain crosslinking between the polymer and the phosphorus esters, it is necessary that the polymer contain a certain number of hydroxyl groups. As will be discussed, the number of hydroxyl groups will vary from polymer to polymer and is not subject to precise definition. Therefore, in the above formula b is at least 1 and is preferably from about 3 to 35 but can be as much as 97 provided the conditions of compatibility and molecular weight are met. The a and c are integers from 0 to 99 and preferably from 3 to 97. The sum of a+b+c equals 100.

The number or percentage of hydroxy groups in the polymer may vary and is dependent upon the type of polymer and the compatibility of the polymer with the phosphorus ester. It may also be possible to select a polymer which does not contain hydroxyl groups but which contains groups readily convertible to hydroxyl groups. In such a case the hydroxyl groups may be formed in situ prior to or during the course of gel formation. Therefore, it is not possible to define precisely with numerical limitations just how the polymer is to be composed. Rather, the polymers to be used may readily be determined by those skilled in the art on an empirical basis. For example, polyvinyl alcohol, is not compartible with a phosphate ester such as dimethyl 2,2-dichlorovinyl phosphase (DDVP). In general, the number of hydroxyl groups in the polymer, calculated as $-(CH_2CHOH)-$ groups, may be as low as 1.0% by weight of the total polymer with the upper hydroxyl content range being determined solely by the compatibility requirement.

The hydroxylated polymers utilized in this invention are generally commercially available and if not can be prepared by conventional means such as saponification of ester groups. For example, the polyvinyl acetals are prepared by reacting the appropriate aldehyde with polyvinyl alcohol. Polyvinyl alcohols are high molecular weight synthetic resins containing various percentages of hydroxyl and acetate groups and are produced by the hydrolysis of polyvinyl acetate. Polyvinyl alcohols are usually classified as partially hydrolyzed (5-30% polyvinyl acetate groups) and completely hydrolyzed (0-5% polyvinyl acetate groups). Both types in various molecular weights and grades are used in preparing commercial polyvinyl acetals.

Polyvinyl acetals such as polyvinyl butyral and polyvinyl formal are commercially available in various molecular weight ranges, with varying degrees of hydroxyl content.

Polyvinyl esters such as polyvinyl acetate and polyvinyl formate, polyvinyl butyrate and polyvinyl isobutyrate are also known in the art and are commercially available. These polyvinyl esters are available in a variety of molecular weights, with varying amounts of hydroxyl groups, and are made by the polymerization or copolymerization of vinyl esters in the conventional manner. Terpolymers of vinyl esters, such as vinyl acetate, with vinyl chloride and vinyl alcohol may also be used.

The phosphorus esters which are useful in the present invention are those which have been termed "activated" phosphorus esters. By "activated" phosphorus esters is meant an ester which has at least one group which may be replaced relatively easily or in other words a "leaving group." In this respect the enol-phosphorus or vinyl phosphorus esters are preferred. These phosphorus compounds have the general formula:

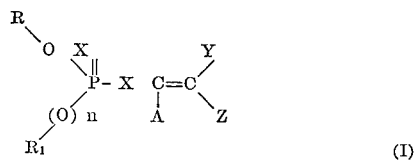

(I)

wherein R and R' may be the same or different and are selected from the group consisting of straight or branched chain alkyl, alkenyl or alkynyl of up to twelve carbon atoms, cycloalkyl of three to eight carbon atoms, aryl, alkaryl, aralkyl or aralkenyl of six to fifteen carbon atoms, which groups may further be substituted by lower alkoxy, halo, nitro, hydroxy, amino, lower alkylamino or di-(lower)alkylamino groups, wherein "lower alkoxy" or "lower alkyl" means groups containing from 1 to 8 carbon atoms, n is 0 or 1, X is oxygen or sulfur, Y is hydrogen or halogen, Z is halogen,

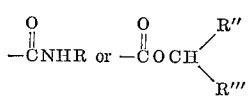

wherein R″ is hydrogen, or alkyl of up to six carbon atoms, and R‴ is hydrogen, phenyl or halophenyl, A is hydrogen, alkyl of up to six carbon atoms, phenyl or halophenyl. By halogen is meant fluorine, chlorine, bromine or iodine and preferably chlorine. Halophenyl means a phenyl ring which may be mono-, di- or tri-substituted by halogen.

Typical of the alkyl groups is methyl, ethyl, butyl, isobutyl, sec-butyl, t-butyl, octyl, decyl and undecyl. Representative of alkenyl groups are allyl, vinyl, octenyl and methallyl. Alkynyl groups such as ethynyl or propargyl may be used. Typical cycloalkyl groups include cyclopropyl, cyclopentyl and cyclohexyl. Inclusive of the groups containing an aryl ring are phenyl, benzyl, phenethyl, tolyl, chlorophenyl, dichlorophenyl, N,N-dimethylaminophenyl, styryl, p-methoxyphenyl, phenylbutyl, and the like.

Preferred are those compounds according to Formula I wherein R and R' are alkyl, n is 1, Z is halogen and A is hydrogen.

Typical species of these compounds include dimethyl 2,2-dichlorovinyl phosphate (DDVP) and diethyl 2-chlorovinyl phosphate.

The cross-linking reaction is acid catalyzed. The acid may be either organic or inorganic. Examples of typical acids include hydrochloric, nitric, sulfuric, sulfonic, phosphoric, phosphonic, acetic and the like. Preferably the acid is a phosphorus acid which is a hydrolysis product of the phosphorus ester used in the interaction. Unless the phosphorus ester is obtained and kept in an anhydrous environment there is usually enough moisture in the atmosphere to cause the phosphorus ester to hydrolyze and form a catalytic amount of the corresponding phosphorus acid. In the absence of a catalytic amount of acid, the interaction will not proceed and cross-linking does not take place. The reaction is believed to proceed according to the following mechanism:

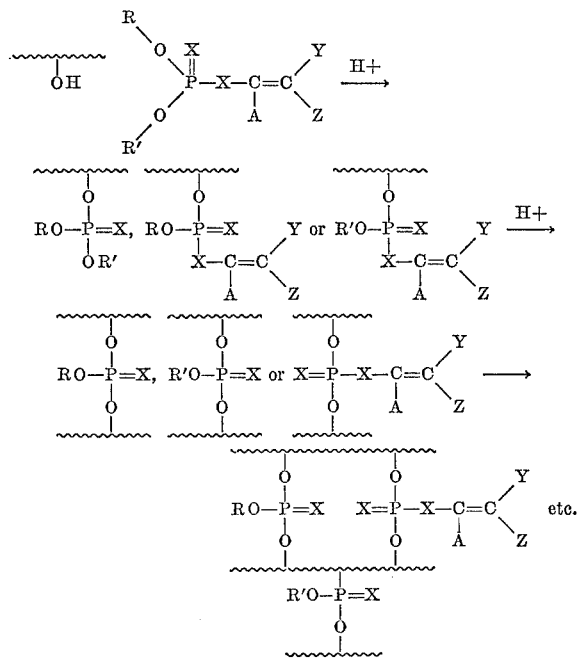

Gel formulations can be made by the addition of as little as 0.5% by weight of the hydroxylated polymer based on the weight of the total composition.

The maximum amount of hydroxylated polymer used in gel formation is dependent upon the particular polymer and phosphorus ester used. There must be sufficient liquid phosphorus ester to give a uniform mixture. In other words, each hydroxylated polymer particle must have enough liquid phosphorus ester around it to completely moisten the polymer surface. If too much polymer is used the mixture will contain localized wet and dry spots and will not form a uniform gel structure. In general, from about 1 to 35% by weight of hydroxylated polymer appears to be the optimum range. As has been previously stated, a certain amount of phosphorus in this mixture is irretrievably combined with the hydroxylated polymer. It is believed that the leaving groups of the phosphorus ester permit that ester to interact with the hydroxyl groups of the hydroxylated polymer thereby forming a cross-linking bond between adjacent chains of the various polymers. In polymers containing ester groupings in addition to hydroxyl groups it is also possible that, through a process of transesterification, cross-linking polymer bonds are also formed.

The gels are made by physically mixing the hydroxylated polymers with the activated phosphorus ester in the presence of a catalytic amount of an acid. When mixed, the mixture is liquid and may be poured, cast, or extruded into any desired geometrical shape and allowed to harden or cure. The temperature, mixing time, and curing time will depend upon the particular polymer and phosphorus ester used. Higher temperatures bring about gelatin and curing at a more rapid rate than lower temperatures. Higher proportions of hydroxylated polymer relative to the activated phosphorus ester also bring about more rapid gelation. Therefore, when working with relatively higher proportions of hydroxylated polymers it may be desirable to carry out the mixing operation under lower temperatures to maintain the mixture in a liquid state sufficiently long to effect thorough mixing and casting into the desired shape.

Gels may also be made or regenerated by soaking a preformed cross-linked polymer network or a gel from which the phosphorus ester has been partially or completely depleted in additional amounts of the liquid phosphorus ester.

The gels are of varying degrees of toughness and are pliable or elastic in nature. Since only a minor proportion of the phosphorus ester is tied up with the hydroxylated polymer the major proportion of the ester remains unchanged. If the vapor pressure of the phosphorus ester is sufficiently high, the ester will diffuse out of the gel network into the surrounding atmosphere. Esters of lower vapor pressure will diffuse to the surface of the gel and when the ester on the gel surface is removed by action such as rubbbing or wiping of the surface additional ester will diffuse out. Esters may also be removed from the gel by leaching action, i.e., by subjecting the gel to an appropriate liquid.

Since many activated phosphorus esters possess biocidal activity and since the rate of release of the ester from the gel network takes place over a predictable prolonged period of time, the gels make excellent slow release biocide generators.

The over-all rate of release of phosphorus ester from the gel network at any given time is dependent upon the temperature of the gel and surrounding environment, the concentration of phosphorus ester in the gel, the amount of free gel surface and the rate of migration of the phosphorus ester from the body of the gel to the surface, the latter being the rate-controlling step. At a given temperature and gel generator size, the rate of release is dependent upon the ability of the phosphorus ester to diffuse from within the gel to the surface. This rate of migration is related to a coefficient of proportionality called the diffusion coefficient.

One of the disadvantages of the prior art slow-release insecticide formulations is that the diffusion coefficient is low and limited in range. As a result, in order to obtain the sustained rate of release of an insecticide from the generator which is required over an extended period of time to control pests, certain restricted geometric configurations must be maintained. The most common geometric configuration has been in the form of a strip of plasticized PVC containing certain amounts of a beta halovinyl pohsphate biocide such as DDVP. This strip is rectangular in shape and, due to the low diffusion coefficient, has to have a relatively large surface area and thin cross section to permit the proper rate of diffusion of an effective amount of the biocide from within the generator to the surface. Because of the low diffusion coefficient, the pesticide emission patterns into the surrounding atmosphere for such formulations follow essentially an exponential curve with a relatively high emission rate at the outset, falling to a relatively constant lower rate. In these prior art formulations, only very limited flexibility in the rates of release from these generators is possible because of the limitations imposed by the required fixed geometry, as well as the diffusion coefficient.

When the initial release of biocide from the prior art PVC resin generators is just above the minimum effective range, the diffusion coefficient is sufficiently low that the diffusion of biocide from the generator falls to an unacceptably low point long before the biocide is depleted from the resin matrix. On the other hand, when the prior art PVC generators are utilized effectively, such as in rooms or other environments, over a sustained period of time, there is an initial high rate of release of pesticide into the atmosphere, followed by a gradually slower sustained release. All such formulations permit pesticides to be used effectively yet safely; however, the rate of release is such as results in a waste of pesticide. The high initial rate is unnecessary to the control of insects and volatile pesticide can be lost physically from a space to be treated and also lost chemically by decomposition caused by moisture. Therefore, at the onset and for some time thereafter, the PVC formulations emit somewhat more of the pesticide than the minimum required for efficacy. Not only does this subject the pesticide to unnecessary loss but materially reduces the effective life of the formulation. Because of processing limitations it is difficult and in some cases impossible, to fabricate a PVC insecticide generator having a substantially thicker profile with less surface area to lower the initial release rate, and even if it were feasible, because of the low diffusion coefficient, the biocide would be released from the generator at an unacceptably low rate in a relatively short period of time.

A major advantage of the compositions of the present invention lies in the ability to more completely control the release rate of biocide from the gel generators as compared to prior art generators. For comparable uses, gel generators can be formulated which initially release less biocide per unit of time than prior art generators but which continue to function effectively over the same period of time or even longer period of time than the prior art generators. This is brought about through properties inherent in the gel compositions and particularly by the enhanced diffusion cofficient attainable with the gels. Because of the enhanced diffusion coefficient the biocides diffuses more readily from within the gel to the gel surface. It is therefore possible to formulate the gels into various geometric configurations having much thicker profiles than the prior art generators. This fact coupled with the ability of the gels to contain more biocide per unit of weight than the prior art compositions and to be easily processed makes it possible to formulate generators which are more compact in size and therefore have less surface areas than prior art generators for similar use. Therefore by regulating biocide content, generator size, surface area and diffusion coefficient it is possible to formulate gel compositions having the desired initial rate of biocide release and which continue to generate biocide at biocidally effective rates over a sustained period of time. These variables are not available to the prior art formulations.

Other than by concentration of hydroxylated polymer and pohsphorus ester, the diffusion coefficient may be varied for any given gel mixture by the addition thereto of a plasticizer of types that are well known in the art. This permits greater control in selecting a particular gel having the desired rate of release of biocide into the atmosphere and also allows for greater flexibility in choosing generator size and shape. Moreover, the addition of the plasticizer also serves other useful purposes. The presence of the plasticizer reduces the gelation rate making those mixtures which have a tendency to gel rapidly more workable. The plasticizer also serves as a diluent for the phosphate esters thereby reducing the inherent toxicity of the gel formulation.

Generally speaking the addition of plasticizer increases the diffusion coefficient. Increased diffusion coefficients make it possible to reduce the surface area of a generator thereby making it more compact in geometry.

The plasticizers which may be used are those conventionally used in the plasticization of thermoplastic resins such as polyvinyl chloride (PVC). These plasticizers are generally of two types, i.e., phosphate esters and esters of polybasic carboxylic acids. The phosphate esters are preferably relatively non-volatile and of the type that do not possess good leaving groups. These compounds are described by the structure 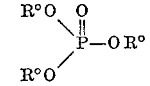 where R° can be the same or different and is a hydrocarbon radical selected from the group consisting of alkyl, aryl, aralkyl, and alkaryl preferably having at least four carbon atoms. These esters are virtually non-volatile but impart excellent plasticized properties to the resulting composition. Because of their similar compositions they are readily compatible with the activtaed phosphorous esters in the gel compositions. Typical phosphate esters include the triaryl phosphates, such as tricesyl phosphate, triphenyl phosphate, tri(p-tert-butylphenyl) phosphate, tri(biphenylyl) phosphate, o-biphenylyl diphenyl phosphate, and cresyl diphenyl phosphate; the trialkyl phosphates such as tri-n-butyl phosphate, tri-2-ethyl-hexyl posphate, tri-n-octyl phosphate and tri-lauryl phosphate; and such mixed pohsphates as 2-ethyl-hexyl diphenyl phosphate and the like. Typical of the esters of polybasic carboxylic acids are pthalate esters, such as dioctyl phthalate, diphenyl phthalate, dicyclohexyl phthalate, dimethyl phthalate and the dihexyl phthalates; the sebacates, such as dibutyl sebacate, diphentyl sebacate, n-butyl benzyl sebacate and dibenzyl sebacate; the adipates, such as dioctyl adipate, dicapryl adipate, diisobutyl adipate and dinonyl adipate, and the citrates such as tributyl citrate. Because of their availability, dioctyl adipate, dioctyl phthalate and tricresyl phosphate are generally used.

Other ingredients such as phermones, dyes, fillers, odorants or other biocides may also be added to the gel mixture without departing from the scope of this invention.

Another important advantage possessed by the gels of this invention is the fact that these compositions are very resistant to "bleeding" or "sweating" which terms are used in the art synonymously. These terms refer to the formation of droplets of liquid at the surface of a biocidal slow release generator. Phosphorus esters, DDVP in particular, are hygroscopic and when they diffuse to the surface of a generator may interact with water from the surrounding environment to form droplets of hydrolysis products on the generator surface. This problem is virtually nonexistent in the formulations of this invention.

A distinct advantage of the gels is their ability to diminish in size at a rate proportional to the rate of depletion of ester from the gel network. This makes it possible to gauge directly the amount of phosphorus ester remaining in the gel based on the extent to which shrinkage has occurred. For example, a phosphorus ester insecticide such as DDVP can be interacted with a hydroxylated polymer to form a gel fabricated in spherical form which is then placed over a cylindrical opening. The relative sizes of the spheres and opening are predetermined with the sphere having a diameter larger than the opening. The change of position of the sphere on the opening informs the user of the degree of depletion of phosphorus ester from the sphere. The relative dimensions are so chosen that at the point at which sub-efficacious amounts of insecticide are being delivered the sphere drops through the opening. From this example myriad other systems of depletion indication based on this principle are evident. One of the disadvantages associated with present commercial slow release resin insectide generators is the inability to determine when efficacious amounts of insecticide cease to be discharged from the generator. Thus, compositions of the present invention offer a solution to this problem.

These gel compositions are highly effective for the killing of invertebrate pests, including various microorganisms, nematodes, ticks, spiders, mites and insects by subjecting them to the composition of the invention. For example, the compositions can be made into medallions which may be hung from a collar of a pet which will result in the sustained release of phosphorus ester over a period of time, thereby controlling normal ectoparasites to be found on such animals such as fleas and ticks. Moreover, the compositions of the present invention can be utilized as granules or pellets and placed in soil wherein the slow sustained release of phosphorus ester from the compositions results in the control of various soil pests such as nematodes, cutworms, rootworms, etc. The gels of the present invention can also be used for fumigation purposes by being placed in warehouses, grain bins, etc. The major use anticipated, however, for the gels is placing the desired geometrical form in a closed space such as a room, whereby the sustained release of phosphorus ester into the atmosphere results in the control of any pests present in the room, i.e., pests such as houseflies and mosquitoes.

EXAMPLE I

The following example is indicative of a method of preparing polyvinyl acetals having free hydroxyl groups contained therein. A three neck 500 milliliter flask equiped with stirrer, internal thermometer and reflux condenser was charged with 300 milliliters of ethyl alcohol, 10 grams of polyvinyl alcohol, 25 grams of paraldehyde, and 3 milliliters of an aqueous 1:1 HCl solution. The reactants were stirred at 78° C. for 30 minutes, at which point the solids dissolved completely to yield a clear solution. The solution was allowed to remain at ambient temperature for 72 hours. The product was then precipitated in water containing a small amount of $NH_4OH$ and redissolved in ethanol. Re-precipitation in water gave a fine, white powder which was collected and dried in a vacuum oven for 18 hours. The product obtained was a polyvinyl acetal containing approximately 20% wt. OH groups calculated as polyvinyl alcohol. The structure was confirmed by elemental and infrared spectral analysis.

EXAMPLE II

Following the procedure of Example I, except using propionaldehyde in the place of paraldehyde, polyvinyl propional was prepared containing approximately 20% wt. OH groups, calculated as polyvinyl alcohol. The structure was confirmed by elemental and infrared spectral analysis.

EXAMPLE III

Example II was repeated using different proportions of polyvinyl alcohol and propionaldehyde to yield a product having approximately 50% wt. OH groups, calculated as polyvinyl alcohol. The structure was confirmed by elemental analysis.

EXAMPLE IV

The procedure of Example I was again used, using 40 grams of valeraldehyde. The reaction period was 7½ hours at 55–78° C. The polymer was purified by precipitation in water from a dioxane solution and found by elemental analysis and infrared spectrum to contain approximately 20% wt. OH groups, calculated on the basis of polyvinyl alcohol.

EXAMPLE V

The preparation of "non-bleeding" solid phosphorus etser gels in comparison with "bleeding" phosphorus ester resins is illustrated by this example. In all of the following runs, the phosphorus ester used was DDVP. The resin was a polyvinyl chloride homopolymer (Geon 135) having an inherent viscosity of 1.12 as determined by ASTM Method D 1243–66. The plasticizer was either dioctyl phthalate (DOP) or dioctyl adipate (DOA) is indicated. The hydroxylated polymer was a polyvinyl butyral (PVB) having an average molecular weight in the range of 38,000 to 45,000, having a hydroxyl content of 18 to 20% expressed as weight percent polyvinyl alcohol, and an acetate content of 0 to 1% expressed as weight percent polyvinyl acetate. The first series of tests were made without polyvinyl butyral. The DDVP/PVC resin and plasticizer were mixed in a glass test tube and placed in an oil bath at 125° C. The mixture was heated until clear and then cooled in the test tube. In the second series of tests, the polyvinyl chloride was replaced by polyvinyl butyral which was added during the mixing step and the procedure outlined above was followed. The mixtures which were solidified in the test tubes were removed by breaking the glass. Each blend was then allowed to stand in an open room and was periodically checked for DDVP bleeding with results as follows:

TABLE I

| Blend | 1 | 2 | 3 | 4 |
|---|---|---|---|---|
| Percent weight: | | | | |
| DDVP | 60 | 60 | 60 | 60. |
| PVC | 30 | 40 | | |
| Plasticizer | 10 [1] | | 10 [2] | |
| PVB | | | 30 | 40. |
| After— | | | | |
| 2 days | No bleeding | Bleeding | No bleeding | No bleeding. |
| 9 days | Bleeding | do | do | Do. |
| 19 days | do | do | do | Do. |
| 8 months | | | do | Do. |

[1] Dioctyl phthalate.
[2] Dioctyl adipate.

This example shows the superiority of the hydroxylated polyvinyl butyral gels over polyvinyl chloride resins in remaining dry.

The following examples show that the interaction between a hydroxylated polymer and an active phosphorus compound produces an inosluble network caused by the binding of the phosphorus to the hydroxylated polymer. Again, whether a covalent bond or a strong complex is formed is not known with certainty.

EXAMPLE VI

A gel was formed by dissolving together 4 parts by weight of DDVP with 1 part by weight of a polyvinyl butyral polymer containing about 80% by weight of polyvinyl butyral units, 18–20% by weight of polyvinyl alcohol units, and 0–2% by weight of polyvinyl acetate units. This polymer had a weight average molecular weight of 1.8 to $2.7 \times 10^5$. This mixture was allowed to stand at room temperature for 30 minutes upon which a solid rubbery gel formed. The gel was put through successive cycles of dissolving the gel in tetrahydrofuran (THF), precipitating with water, and decanting the liquid. A portion of the precipitate was taken after each cycle, washed several times with water, an analyzed for phosphorous. The cycles were repeated until a constant phosphorus content remained in the precipitate which indicated that all the phosphorus contained at that point was bound phosphorus. The phosphorus content remaining after each cycle is shown in the table below.

TABLE II

| Cycle No.: | Bound percent phosphorus |
|---|---|
| 1 | 5.0 |
| 2 | 0.56 |
| 3 | 0.13 |
| 4 | 0.088 |
| 5 | 0.074 |
| 6 | 0.086 |

The initial gel had a phosphorus content of about 11.2% w. This example shows that while the majority of the phosphorus in the gel remains unbound a small portion of phosphorus does interact with the hydroxylated polymer to form a network containing bound phosphorus.

Bound phosphorus in the polyvinyl butyral-DDVP gels was also determined by thermogravimetric analysis and by thermal analysis using flame ionization detection.

EXAMPLE VII

A series of gels were made using various hydroxylated polymers. These gels were made by mixing 1 gram of polymer with 4 grams of DDVP at ambient temperatures and then curing at 80° C. for 1 hour. The various gels were then exhaustedly extracted with tetrahydrofuran to a constant phosphorus content with the results being as follows:

TABLE III

| Polymer | Percent OH content [1] | Viscosity (cps.)[2] | Percent bound phosphorus |
|---|---|---|---|
| Polyvinylacetal | 20 | 170 | 0.44 |
| Polyvinylpropional | 20 | 110 | 0.41 |
| Polyvinylbutyral | 20 | 116 | 0.3 |
| Polyvinylvaleral | 20 | 39 | 0.3 |
| Do | 80 | | 0.16 |
| Acetylated polyvinyl alcohol | 20 | | 0.47 |
| Polyvinylacetate | None | [3] 500,000 | (4) |
| Polyvinyl alcohol | | [5] 55–65 | (4) |

[1] Calculated as percent wt. polyvinyl alcohol units.
[2] 5% solution in 60:40 toluene-ethanol at 25° C. using a Brookfield Viscometer.
[3] Average mole weight.
[4] No gelation.
[5] 4% water solution at 20° C.; Hoeppler falling ball method.

EXAMPLE VIII

Other hydroxylated polymers not of the polyvinyl acetal polyvinyl ester series that form gels with active phosphorus esters are as follows:

TABLE IV

| Polymer | Percent OH content | Mole wt. | Percent bound phosphorus |
|---|---|---|---|
| Hydroxypropyl cellulose | 17 | 900,000 | 0.2 |
| Carbopol 940®* | 17 | 3–5×10⁶ | 0.2 |

*An acid carboxyvinyl polymer copolymerized with about 2% polyallyl sucrose.

EXAMPLE IX

Various polymers from the groups named in Table V, 1 gram of each, were mixed with 4 grams of DDVP as in the previous examples and allowed to remain at ambient temperatures or, in some conditions, were heated at higher temperatures in an attempt to form a cross-linked network. None of the polymers showed evidence of forming a stable gel having bound phosphorus.

TABLE V

Cellulose acetate
Cellulose acetate butyrate
Ethyl cellulose
Styrene-allyl alcohol copolymer
Epichlorhydrin-bisphenol A resin
Ethylene-vinylacetate copolymer
Nylon
Polyvinyl acetate
Polyvinylpyrrolidone-vinyl acetate copolymer
Polymethyl methacrylate
Polyvinyl pyrrolidone
Polyacrylic acid
Shellac
Vinylpyrrolidone-ethyl acrylate copolymer
Polyethylene glycol It is possible, however, that if the above polymers were to be modified to meet the critical criteria of compatibilty, molecular weight and hydroxyl content that they would be capable of forming stable gels with activated phosphorus esters.

EXAMPLE X

According to the procedure of the preceding example, 1 gram of polyvinyl butyral having a hydroxyl content of about 18–20% by weight based on polyvinyl alcohol and an average molecular weight of about 220,000 was mixed with 4 grams of the phosphorus esters listed in Table VI below. These mixtures were cured under two sets of conditions identified in Table VI as A and B. Condition A involved curing at ambient temperatures for approximately 0.5–4 hours. Under condition B the mixture was cured at 70° C. for 2 hours and then at ambient temperature for an additional 72 hours. In the table under A and B, "−" means no gelation, "+" means partial gelation, and "++" means a tough gel was formed.

TABLE VI

| Phosphorus ester | Cure A | Cure B |
|---|---|---|
| $(CH_3O)_2P(O)-OCH=CCl_2$ | ++ | ++ |
| $(CH_3O)_2P(S)-OCH=CCl_2$ | ++ | ++ |
| $(CH_3O)(CH_3)P(O)-OCH=CCl_2$ | ++ | ++ |
| $(C_2H_5O)(C_6H_5)P(O)-OCH=CCl_2$ | ++ | ++ |
| $(C_2H_5O)((C_2H_5)_2N-C_6H_4-)P(O)-OCH=CHCl$ | + | ++ |
| $(CH_3O)(C_6H_5)P(O)-O-C(Cl)=CH-C_6H_3Cl_2$ | − | ++ |
| $(C_2H_5O)(C_6H_5)P(O)-O-C(Cl)=CH-C_6H_3Cl_2$ | − | ++ |
| $(CH_3O)(C_2H_5)P(S)-OC(Cl)=CH-C_6H_3Cl_2$ | − | ++ |
| $(C_2H_5O)_2P(S)-O-C(Cl)=CH-C_6H_3Cl_2$ | − | + |
| $(CH_3O)_2P(O)-O-C_6H_3(CH_3)(SCH_3)$ | − | + |

TABLE VI—Continued

| Phosphorus ester | Cure A | Cure B |
|---|---|---|
| $C_2H_5O-\underset{C_2H_5O}{\overset{S}{\underset{\|}{P}}}-O-\text{(2-isopropyl-6-methyl-pyrimidin-4-yl)}$ | − | + |
| $CH_3O-\underset{CH_3O}{\overset{S}{\underset{\|}{P}}}-O-C_6H_4-NO_2$ | − | + |
| $CH_3O-\underset{CH_3O}{\overset{O}{\underset{\|}{P}}}-OCH-\underset{Br}{\overset{Cl}{\underset{\|}{C}}}-Cl$ (Br) | − | − |
| $CH_3O-\underset{CH_3O}{\overset{O}{\underset{\|}{P}}}-OCH_3$ | − | − |
| $CH_3C_6H_4O-\underset{CH_3C_6H_4O}{\overset{O}{\underset{\|}{P}}}-O-C_6H_4CH_3$ | − | − |

From the above table, it is evident that those esters having a vinyl group gel more readily than do the non-vinyl esters. It is therefore evident that the vinyl group is a better leaving group or, for the purposes of this application, vinyl containing phosphorus esters are more "activated" esters than are other esters not having this group.

EXAMPLE XI

In order to demonstrate the difference between phosphorus esters having good leaving groups, i.e., activated phosphorus esters vs. nonactivated phosphorus esters, the following experiment was carried out. Mixture A was prepared using 4 grams of DDVP and 1 gram of polyvinyl butyral, having an hydroxyl content of approximately 20%. Mixture B was prepared using 4 grams of trimethyl phosphate and 1 gram of the same polyvinyl butyral. Both mixtures were aged at room temperature for 10 minutes, and the examined. Mixture A was tough and rubbery and was shaped somewhat like a rubber ball. Mixture B was still soft and appeared merely to be a solution of polymer in trimethyl phosphate. Both mixtures were then cured in an oven at 55–60° C. for 20 hours. They were then removed from the oven, cooled and re-examined. Mixture A comprised 4.7 grams of an amber colored, tough, rubbery gel which was abrasion-resistant. Mixture B comprised 4.4 grams of a soft, colorless syrup with no evidence of gel formation.

Each sample was then extracted exhaustively in 75 cc. of tetrahydrofuran (THF) at 50° C. Mixture A yielded an insoluble residue in the solvent, whereas Mixture B was completely dissolved in the THF after only a few minutes. Mixture B was precipitated by addition of water to the THF, re-dissolved in THF and reprecipitated in water. The precipitate was dissolved in acetone and again precipitated in water and dried. Mixture A was extracted for several days with fresh portions of THF and the remaining polymer was washed with methylene chloride and dried in a vacuum along with the precipitate from Mixture B. After drying, Mixture A was obtained as a hard, tough resin, whereas Mixture B was obtained as a colorless, soft polymer. Upon analysis, Mixture A was found to contain 1.63% phosphorus which represented cross-linking of 11.6% of the DDVP involved, whereas Mixture B was found to contain only 0.02% phosphorus which would involve only 0.09% of the trimethyl phosphate added. This adequately demonstrates the difference between the so-called "activated" phosphorus esters and the so-called "nonactivated" phosphorus esters:

EXAMPLE XII

Another experiment was carried out utilizing a 4:1 weight ratio of phosphorus ester to hydroxylated polymer. The hydroxylated polymer was polyvinyl butyral containing approximately 20% by weight hydroxy groups. The products were mixed at room temperature and allowed to cure at 80° C. for 1 hour, with the following results:

TABLE VII

| Phosphorus ester | Gel formed | Percent bound phosphorus* |
|---|---|---|
| $CH_3O-\underset{CH_3O}{\overset{O}{\underset{\|}{P}}}-OCH=C(Cl)_2$ | Yes | 2.1 |
| $CH_3O-\underset{CH_3O}{\overset{O}{\underset{\|}{P}}}-OC(CH_3)=CHC(O)-NHCH_3$ | Yes | 3.0 |
| $CH_3O-\underset{CH_3O}{\overset{O}{\underset{\|}{P}}}-O-C(CH_3)=CHC(O)OCH_3$ | Yes | 1.3 |
| Same as above | Yes | **2.8 |
| $C_2H_5O-\underset{C_2H_5O}{\overset{O}{\underset{\|}{P}}}-OCH=CHCl$ | Yes | 1.1 |
| $C_4H_9O-\underset{C_4H_9O}{\overset{O}{\underset{\|}{P}}}-OCH=C(Cl)_2$ | Yes | 0.51 |
| $C_2H_5O-\underset{Cl_2C=CHO}{\overset{O}{\underset{\|}{P}}}-OC(\text{2,4-dichlorophenyl})=CHCl$ | Yes | 0.2 |
| $(CH_3O)_3P=O$ | No | |
| $\left(\underset{CH_3}{\text{cresyl}}-O\right)_3P=O$ | No | |
| $(CH_3O)_2P(O)-OH$ | No | |

*Based upon the phosphorus content of the reagent ester.
**Cured 21 hours.

This example again shows the importance of using an activated ester to obtain a cross-linking network with the hydroxylated polymer and hence good gel formation.

EXAMPLE XIII

Release rates of the gel formulations were compared with the rate of release of prior art polyvinyl chloride (PVC) slow release generators containing the same amount of DDVP or having the same surface area.

Sample A was a gel consisting of 90% w. DDVP and 10% w. of the polyvinyl butyral described in Example VI. This gel was stored at 100° F. for four days prior to the start of the experiment to provide maximum gelation. The gel was placed in a cylindrical plastic container 1.14 inches in diameter and 0.39 inches high. There was only one vaporizing surface with an area of 1.56 in.$^2$. The initial weight of the gel was 15.2 grams. An analysis of an identical portion of the gel not used in Sample A showed a DDVP content of 81.7% w. which is the amount of unbound DDVP available for release. This corresponds to 12.4 grams of DDVP.

Sample B was a PVC type generator consisting of 23% w. DDVP, 19% dioctyl adipate as plasticizer, 3% w. of a PVC stabilizer and 55% w. of PVC. The generator was rectangular in shape having dimensions of 2.58 x 4.98 x 0.21 inches. All surfaces were exposed making a total vaporizing surface of 28.9 in.². The initial generator weight was 55.7 grams. An analysis of an identical portion of the generator not used in Sample B showed a DDVP content of 22.2% w. which corresponds to 12.4 grams of DDVP the same as in Sample A.

Sample C was the same formulation as Sample B but was placed in a plastic container identical in size and shape with Sample A. This sample had an initial weight of 12.8 grams which corresponds to 2.8 grams of DDVP.

All three samples were placed in a controlled atmosphere and maintained at 70–75° F. with a room humidity of 30–50%. Fresh air was passed over the samples at the rate of 100 linear ft./min. and weighed at periodic intervals. The weight loss is recorded in Table VIII following.

TABLE VIII

| Days: | Weight loss (grams) | | |
|---|---|---|---|
| | A | B | C |
| 15 | 2.6 | 2.1 | 0.11 |
| 30 | 4.1 | 3.0 | 0.16 |
| 45 | 5.1 | 3.6 | 0.19 |
| 60 | 6.2 | 3.9 | 0.22 |
| 75 | 7.2 | 4.2 | 0.25 |
| 90 | 7.7 | 4.5 | 0.27 |
| Percent weight loss at 90 days | 61.2 | 36.3 | 10 |
| Approximate diffusion coefficient | (1) | (2) | (2) |

[1] 5×10⁻⁴ in.²/day.
[2] 7×10⁻⁵ in.²/day.

This shows that the composition of the present invention exhibits a greater degree of DDVP utilization and higher rate of DDVP diffusion at more compact geometry than the prior art generators.

EXAMPLE XIV

Gels were made using different phosphorus esters and hydroxylated polymers at various concentrations. In some cases a plasticizer was also used. The gels were all mixed and cured in 2½ inch diameter aluminum weighing dishes unless otherwise noted.

The gels were placed in a 6 x 6 x 6 ft. Peet Grady Chamber about one third of the way along the East-West Center line about one foot from the ceiling. Four cages containing 10 houseflies each were hung two feet from the ceiling evenly spaced along the North-South Center line. A circulation fan kept air constantly circulating throughout the chamber. The time, in minutes, to effect a 50% knockdown (KD 50) and a 90% knockdown (KD 90) of the flies was recorded. The results are tabulated in Table IX.

placed in the center of the room about 10" from the floor. Mortality counts were made after 2 hours exposure and after 24 hours exposure. The results are recorded in Table X.

TABLE X

| Insect | Percent mortality after— | |
|---|---|---|
| | 2 hours | 24 hours |
| Housefly | 100 | 100 |
| Mosquito (anopheles) | 100 | 100 |
| German roach (male) | 0 | 100 |
| Flour beetle | 0 | 100 |
| Rice weevil | 0 | 100 |
| Granary weevil | 0 | 100 |
| Pea aphid | 0 | 100 |
| 2 spotted spider mite | 0 | 100 |
| Corn earworm larvae (4th Instar) | 0 | 0 |

What is claimed is:

1. A gel-like composition useful for controlling invertebrate pests comprising a mixture of (1) a pesticidally effective amount of a phosphorus ester of the formula

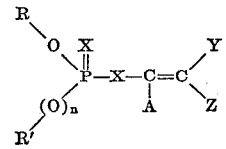

wherein R and R' may be the same or different and are selected from the group consisting of straight or branched chain alkyl, alkenyl or alkynyl of up to twelve carbon atoms, cycloalkyl of three to eight carbon atoms, aryl, alkaryl, aralkyl and aralkenyl of six to fifteen carbon atoms, which groups may further be substituted by lower alkoxy, halo, nitro, hydroxy, amino, lower alkylamino or di(lower)alkylamino, $n$ is 0 or 1, X is oxygen or sulfur, Y is hydrogen or halogen, Z is halogen,

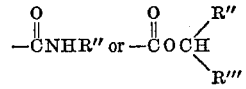

wherein R" is hydrogen or alkyl of up to six carbon atoms and R''' is hydrogen, phenyl or halophenyl, A is hydrogen, alkyl of up to six carbon atoms, phenyl or halophenyl and (2) from about 0.5% to 35% by weight of the total composition of a hydroxylated polymer compatible with said ester having a molecular weight of about 30,000 to 1,000,000 and having the structure

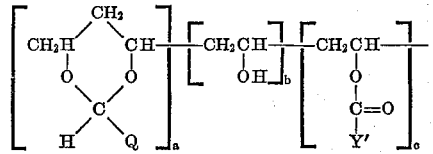

TABLE IX

| Gel composition | Gel weight (grams) | Curing time and temp. | Peet Grady temp. and humidity | KD 50 (min.) | KD 90 (min.) |
|---|---|---|---|---|---|
| 95% DDVP, 5% PVB [1] | 39 | 80° C., 4 hrs | 75° F., 50% | 34 | 44 |
| 60% 2-carbomethoxy-1-methylvinyl dimethyl phosphate, alpha isomer, 30% PVB,[1] 10% tributyl citrate. | [2] 200 | 70° C., ½ hr | 75° F., 50% | 195 | 225 |
| 25% DDVP, 50% dibutyl sebacate, 25% PVB [1] | 40 | 70° C., ½ hr | 75° F. | 135 | 147 |
| 80% DDVP, 20% hydroxypropyl cellulose [3] | 35 | 100° C., ½ hr | 75° F., 50% | 64 | 77 |
| 40% 2-chlorovinyl diethyl phosphate, 40% tricresyl phosphate, 20% PVB [1] | 39 | 80° C., 2½ hr | 75° F., 50% | 190 | 205 |
| 80% 2-chlorovinyl diethyl phosphate, 20% PVB [1] | 39 | 80° C., 2½ hr | 59° F. | 333 | 385 |
| 40% DDVP, 40% tricresyl phosphate, 20% PVB [1] | 38 | 80° C., 1 hr | 75° F., 50% | 94 | 111 |
| 80% DDVP, 20% PVB [1] | 38 | 80° C., 1 hr | 61° F. | 140 | 161 |

[1] PVB = Polyvinyl butyral described in Example VI.
[2] 6" diameter glass Petri dish.
[3] OH content 17% w.; M.W. 900,000.

EXAMPLE XV

A 2½" aluminum weighing dish containing about 40 grams of a gel consisting of 80% DDVP and 20% of the polyvinyl butyral described in Example VI was placed in the center of a 6 x 6 x 6 ft. Peet Grady Chamber about 12" from the top. Cages containing various insects were wherein Q is H, alkyl, haloalkyl or hydroxyalkyl of 1 to 8 carbon atoms, alkenyl of 2 to 8 carbon atoms, halogen or hydroxyl, Y' is alkyl of 1–9 carbon atoms, $a$, $b$ and $c$ are integers indicating the relative percent by weight of the respective groups in the polymer, $a$ being an integer from 0 to 99, $b$ being an integer of at least 1 and $c$ being an integer from 0 to 99; wherein about 0.5 to 5% of said ester is interacted with said polymer to form a cross-linked polymer network.

2. The composition according to claim 1 wherein R and R' are alkyl, $n$ is 1, Z is halogen and A is hydrogen.

3. The composition according to claim 1 wherein $b$ is an integer from 3 to 35 and $a$ and $c$ are integers from 0 to 97.

4. The composition according to claim 2 wherein R and R' are methyl, Z is chlorine, Y is chlorine and X is oxygen.

5. The composition according to claim 4 wherein $a$ is an integer of about 80, $b$ is an integer from about 18–20 and $c$ is an integer of 0–2, Q is $C_3H_7$ and Y' is $CH_3$.

6. The composition according to claim 5 wherein the polymer has an average molecular weight of about 180,000 to 220,000.

7. The composition according to claim 1 which additionally contains a plasticizer for thermoplastic resins.

8. A method of killing invertebrate pests which comprises subjecting said pests to a pesticidally effective amount of the composition of claim 1.

9. The method according to claim 8 wherein R and R' are methyl, Z is chlorine, Y is chlorine and X is oxygen, and $n$ is 1.

10. The method according to claim 9 wherein $a$ is an integer of about 80, $b$ is an integer from about 18–20 and $c$ is an integer of 0–2, Q is $C_3H_7$ and Y' is $CH_3$.

References Cited
UNITED STATES PATENTS

| | | | |
|---|---|---|---|
| 3,318,767 | 5/1967 | Folckemer et al. | 424—219 |
| 3,424,601 | 1/1969 | Hamilton | 106—177 |
| 2,733,229 | 1/1956 | Brace | 260—73 |

VINCENT D. TURNER, Primary Examiner

U.S. Cl. X.R.

424—19, 219